Jan. 20, 1959

A. E. LITTLE 2,869,456

MOTOR OPERATED CHECKWRITER

Filed May 14, 1956

INVENTOR:
Alfred E. Little
BY
Brown, Jackson, Boettcher & Dienner.
Attys.

Jan. 20, 1959  A. E. LITTLE  2,869,456
MOTOR OPERATED CHECKWRITER
Filed May 14, 1956  10 Sheets-Sheet 2

INVENTOR:
Alfred E. Little
BY
Brown, Jackson, Boettcher & Dienner
Attys.

Jan. 20, 1959  A. E. LITTLE  2,869,456
MOTOR OPERATED CHECKWRITER
Filed May 14, 1956  10 Sheets-Sheet 3

INVENTOR:
Alfred E. Little
BY
Brown, Jackson, Boettcher & Dienner,
Attys.

Jan. 20, 1959

A. E. LITTLE 2,869,456

MOTOR OPERATED CHECKWRITER

Filed May 14, 1956

INVENTOR.
Alfred E. Little
BY
Brown, Jackson, Boettcher & Dienner,
Attys.

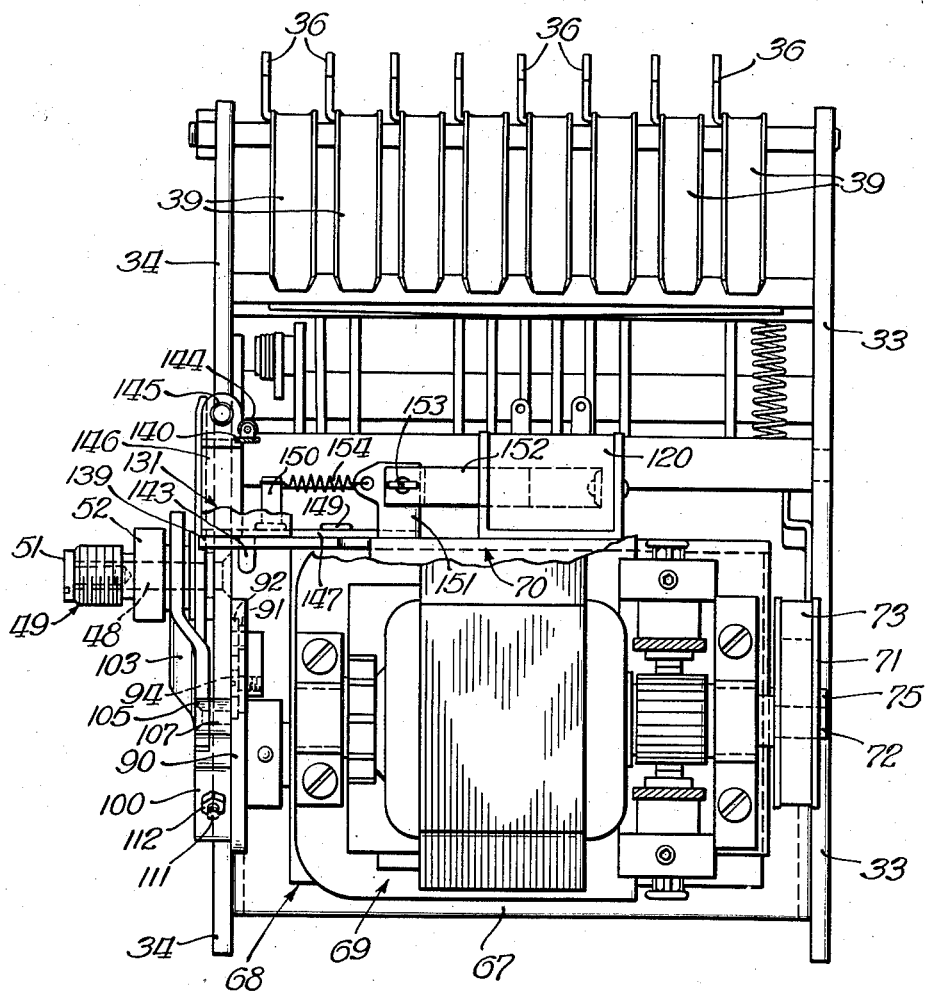

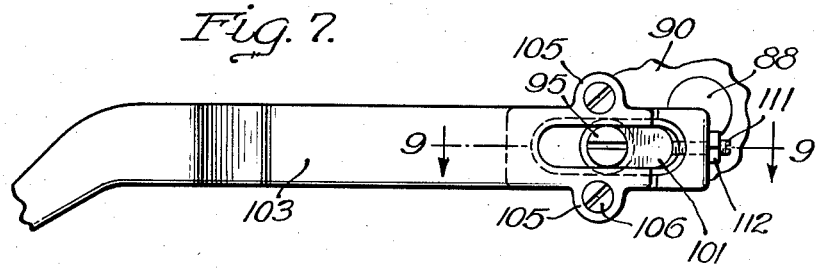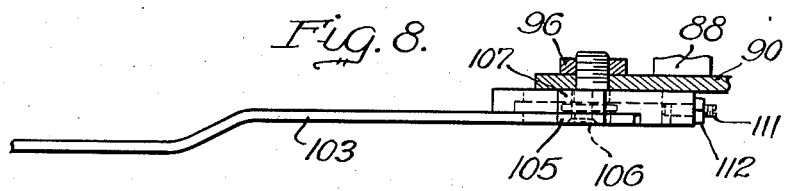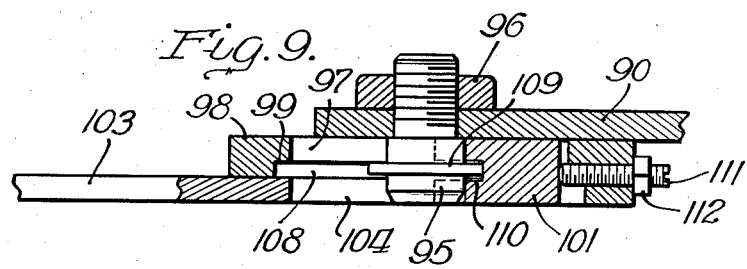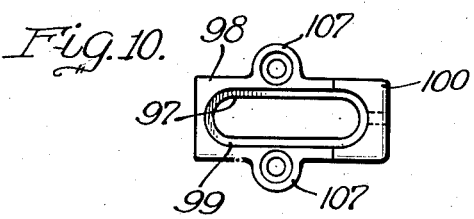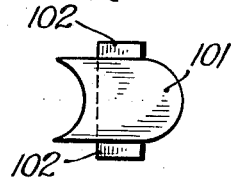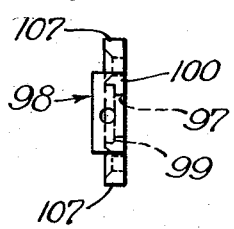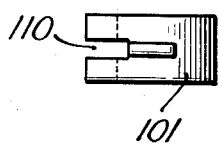

Jan. 20, 1959     A. E. LITTLE     2,869,456
MOTOR OPERATED CHECKWRITER
Filed May 14, 1956     10 Sheets—Sheet 8
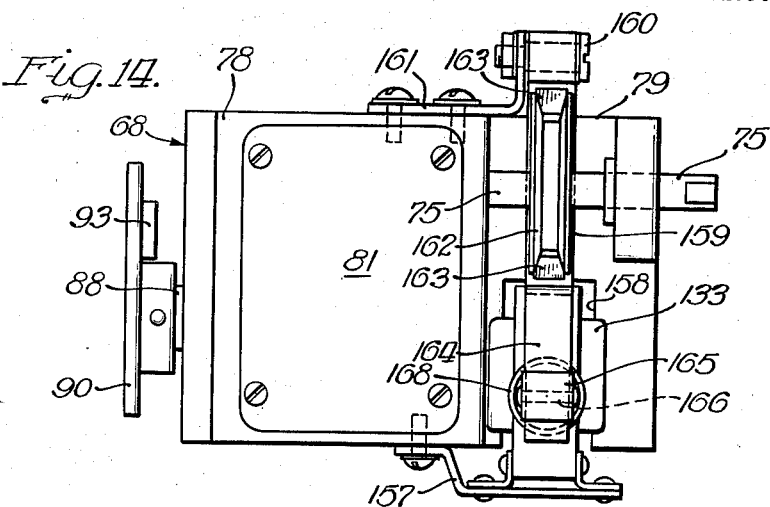
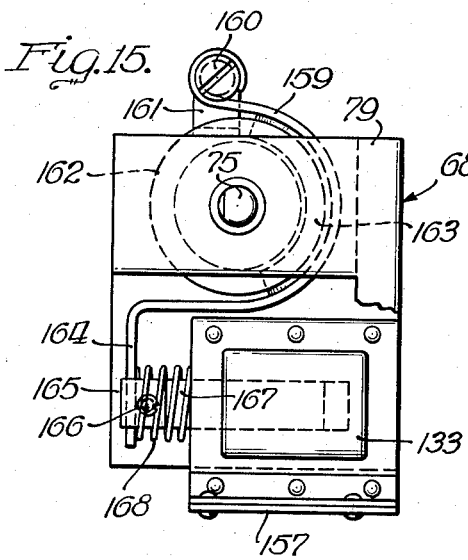
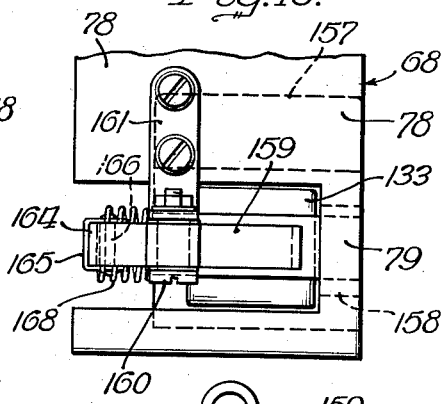
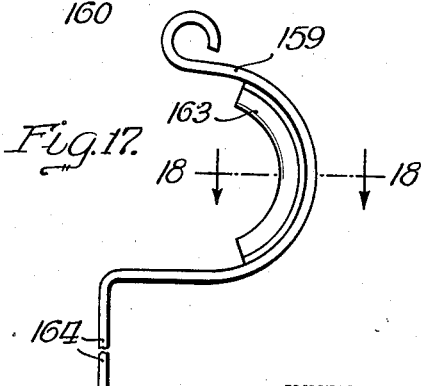
INVENTOR:
Alfred E. Little
BY
Brown, Jackson, Boettcher & Dienner
Attys.

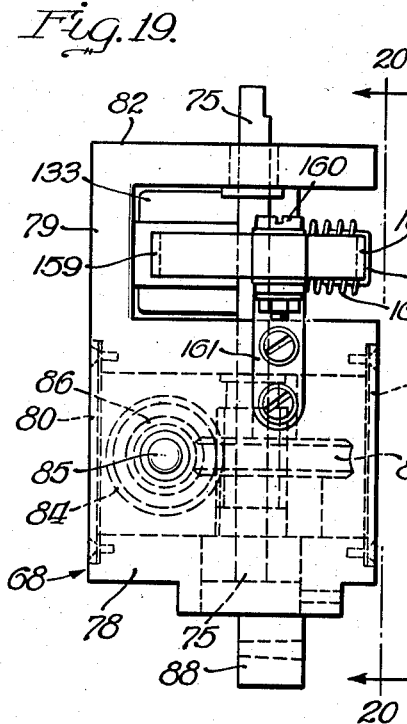
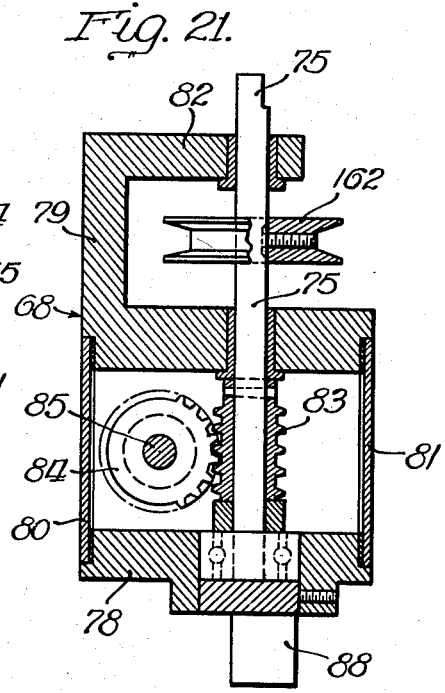
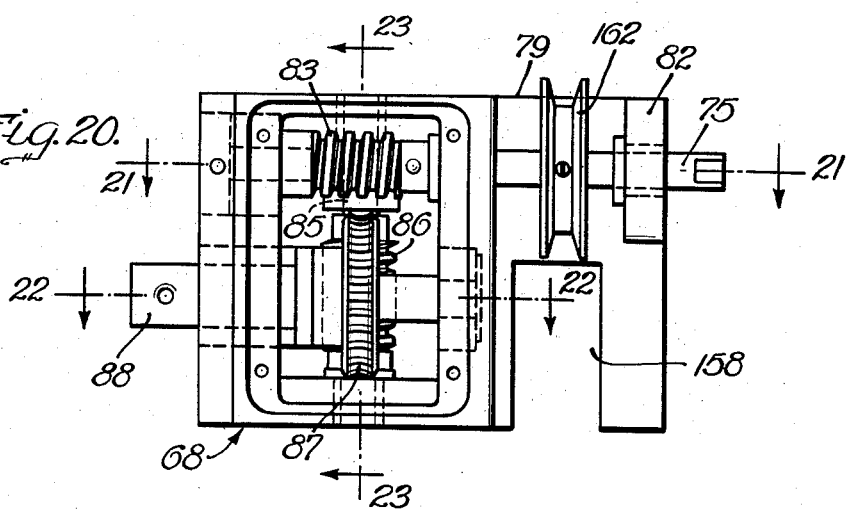

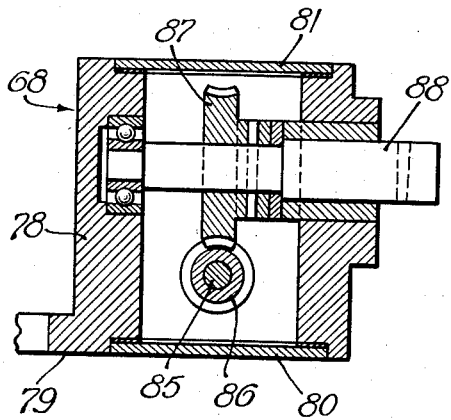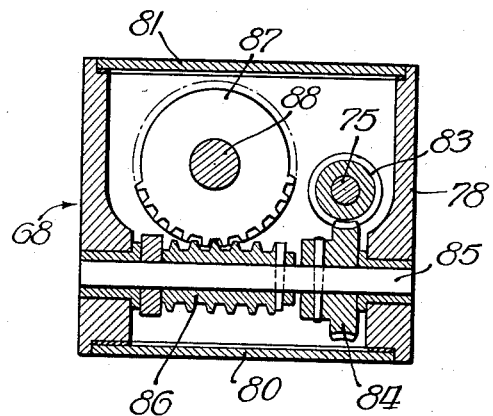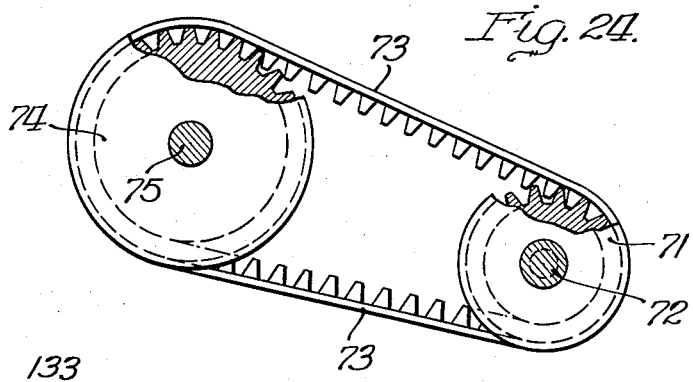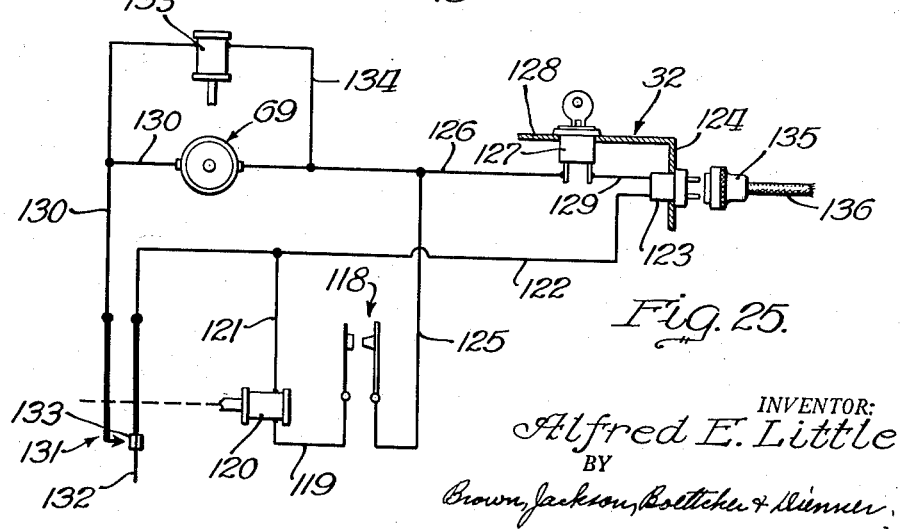

United States Patent Office 2,869,456
Patented Jan. 20, 1959

2,869,456
MOTOR OPERATED CHECKWRITER

Alfred E. Little, Gary, Ind., assignor to Theodore B. Hirschberg, Jr., Chicago, Ill.

Application May 14, 1956, Serial No. 584,488

8 Claims. (Cl. 101—95)

This invention relates to checkwriters, and has to do with a motor driven checkwriter.

Motor driven checkwriters are known. In all of such checkwriters with which I am familiar mechanical clutch means is used for actuating the printing mechanism. That renders the checkwriter noisy in operation and subjects the mechanism thereof to impact and jolts with resultant wear of parts, or breakage. The known motor operated checkwriters are noisy in operation, subject to mechanical failures and are apt to be inaccurate in operation.

My invention is directed to a motor operated checkwriter which is comparatively quiet in operation and in which the mechanism is not subjected to objectionable jolts and jars and accuracy in operation is assured. To that end I eliminate clutch means and control operation of the printing mechanism by automatically actuated switch and brake means assuring accuracy in operation of the printing mechanism while avoiding objectionable clashing of parts or other noise during such operation. The means for operating the printing mechanism comprises a high speed series wound electric motor and speed reducing means having an input shaft directly driven by the motor and an output shaft driven at extremely low speed relative to the input shaft and having driving connection to the printing mechanism. That renders feasible a motor of small size while assuring adequate power for operating the checkwriter which may, therefore, be of compact construction and of comparatively small size and light weight. The speed reducing unit also is compact and of comparatively small size and, when not in operation, serves to lock the operating connections between the speed reducing unit and the printing mechanism against movement thereby guarding against any objectionable displacement of the parts. Further objects and advantages of my invention will appear from the detail description.

In the drawings:

Figure 6 is a rear view of the checkwriter of Figure 5, with the upper portion of the motor broken away;

Figure 7 is an outer face view, partly broken away and on an enlarged scale, of the printing mechanism operating link and associated parts;

Figure 8 is a view as seen from above of the link and parts shown in Figure 7, showing also, fragmentarily and in section, the sector plate to which the link is connected;

Figure 9 is a sectional view, on an enlarged scale, taken substantially on line 9—9 of Figure 7, showing also, in section and fragmentarily, the sector plate to which the link is connected;

Figure 10 is an outer face view of the guide plate secured to the rearward end of the printing mechanism operating link;

Figure 11 is a front end view of the guide plate of Figure 10;

Figure 12 is an outer face view, on an enlarged scale, of the pressure transmitting block mounted in the guide plate and the rearward end of the printing mechanism operating link;

Figure 13 is a top plan view of the block of Figure 12;

Figure 14 is a rear view of the speed reducing unit and the brake assembly;

Figure 15 is a side view of the speed reducing unit and brake assembly of Figure 14, partly broken away;

Figure 16 is a fragmentary plan view of the speed reducing unit and brake assembly of Figure 14, certain parts being omitted for clearness of illustration;

Figure 17 is a side view, on an enlarged scale, of the brake band and lining;

Figure 18 is a sectional view, on an enlarged scale, taken substantially on line 18—18 of Figure 17;

Figure 19 is a top plan view of the speed reducing unit and the brake;

Figure 20 is a rear view of the speed reducing unit, with the rear cover plate removed, taken substantially on line 20—20 of Figure 19;

Figure 21 is a sectional view taken substantially on line 21—21 of Figure 20, certain parts being shown in elevation;

Figure 22 is a sectional view taken substantially on line 22—22 of Figure 20, certain parts being shown in elevation;

Figure 23 is a sectional view taken substantially on line 23—23 of Figure 20, certain parts being shown in elevation;

Figure 24 is a sectional view, on an enlarged scale, taken substantially on line 24—24 of Figure 4, certain parts being partly broken away and shown in section; and Figure 25 is a circuit diagram of the control circuits.

The motor operating means of my invention may be used for operating the printing mechanism of any suitable checkwriter. I have illustrated it, by way of example, as applied to a checkwriter having printing mechanism the same as that of Patent No. 2,697,981, issued December 28, 1954, to Arthur G. Rindfleish as assignor to Theodore B. Hirschberg, Jr., and a brief description of the checkwriter unit or printing mechanism of my present invention will suffice.

Figure 4:
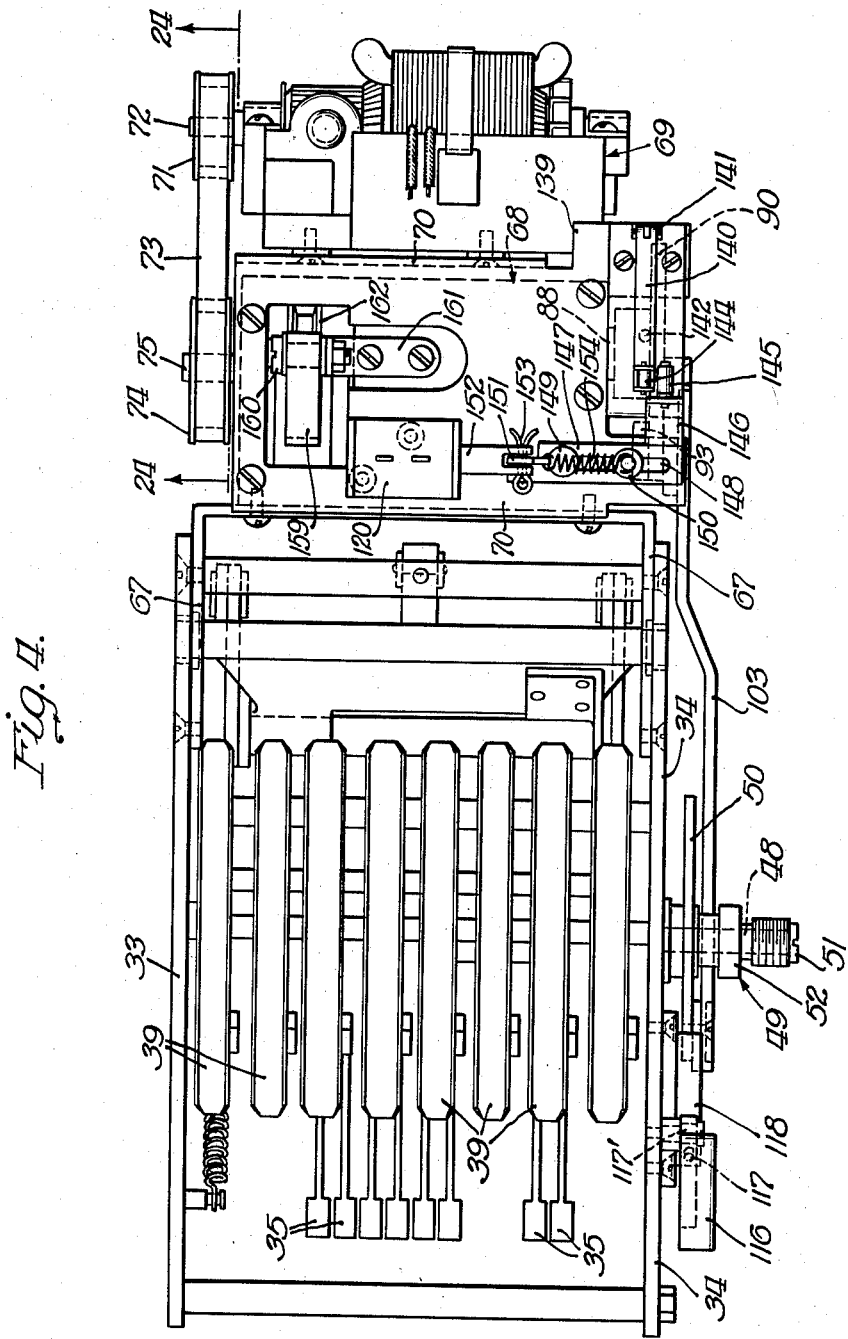
Figure 4 is a top plan view of the checkwriter of Figure 1 with the enclosing casing removed.
Figure 5:
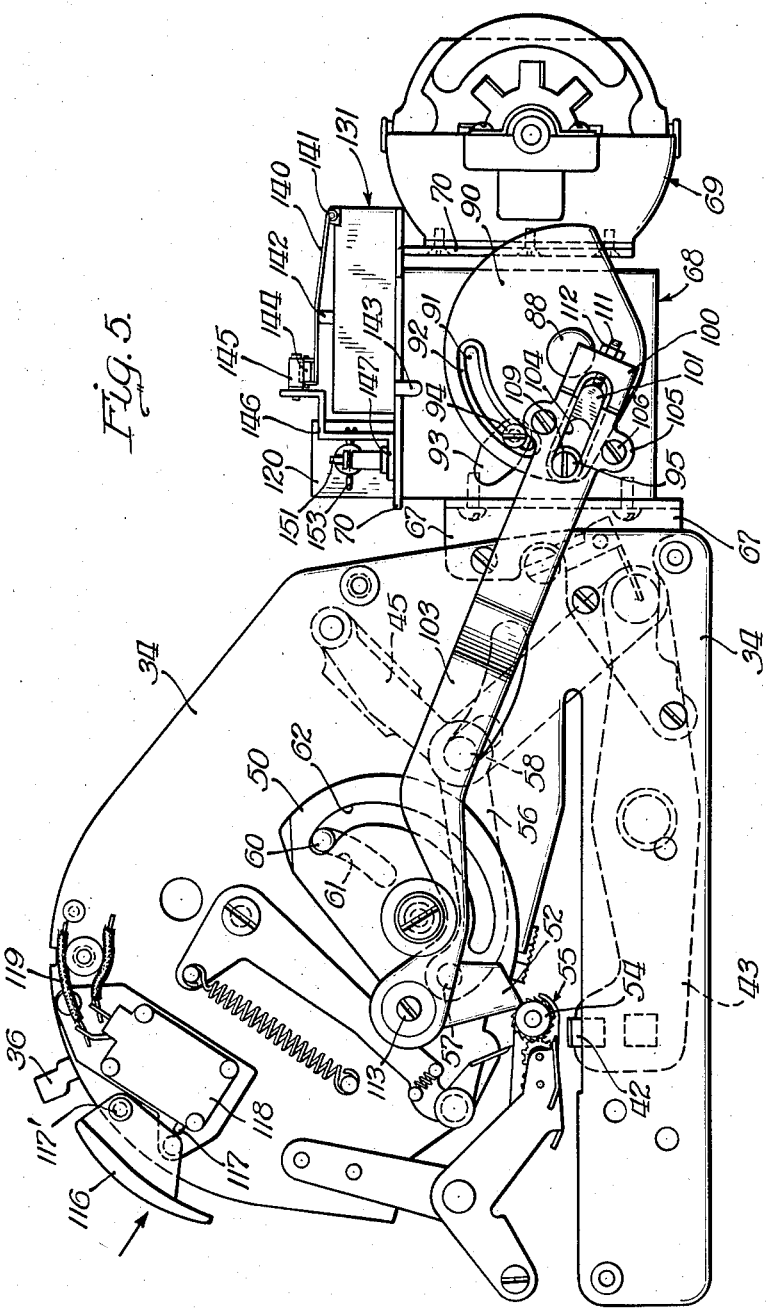
Figure 5 is a side view of the checkwriter of Figure 4.

The checkwriter of my invention comprises a power unit and a checkwriter or printing unit, both enclosed by a suitable housing or casing 30 removably mounted thereon in a suitable known manner and comprising an upper portion 31 and a lower portion 32. The checkwriter unit comprises a main frame having side plates 33 and 34 (Figures 4 and 5). A plurality of type segments 35 are mounted between plates 33 and 34 for adjustment about a common horizontal axis, by means of fingers 36 secured thereto and extending forwardly through slots 37 in a plate 38 secured to the front of the upper section 31 of casing 30. A numbered index strip 39 is secured to each finger 36 substantially concentric with the corresponding type segment 35 and is disposed in back of an observation opening or window 40 in plate 38, for indicating the setting of the segment. Plate 38 is further provided adjacent each slot 37 with a series of characters corresponding to those on the corresponding segment, and a finger grip 41 is removably secured on the outer end of each finger. The type segments 35 are adjusted with reference to a printing line of the machine and cooperate with a printing platen 42 (Figure 5) carried at the forward ends of arms 43 pivoted on a shaft 44 extending between the side plates 33 and 34. Means (not shown), including a perforating platen carried by arms pivoted on shaft 44, is also provided for perforating the payee area of a check when desired. The platens are operated by means comprising a toggle 45.

Figure 1:
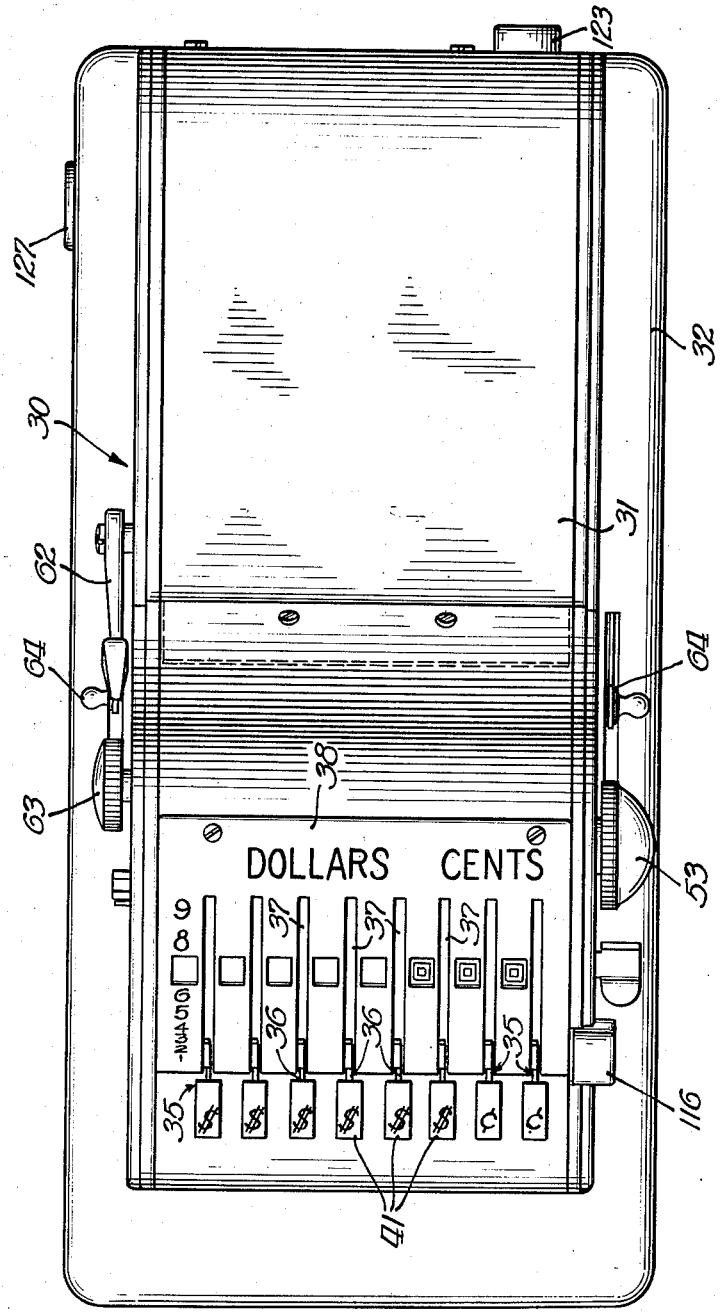
Figure 1 is a top plan view of a motor operated checkwriter embodying my invention.
Figure 2:
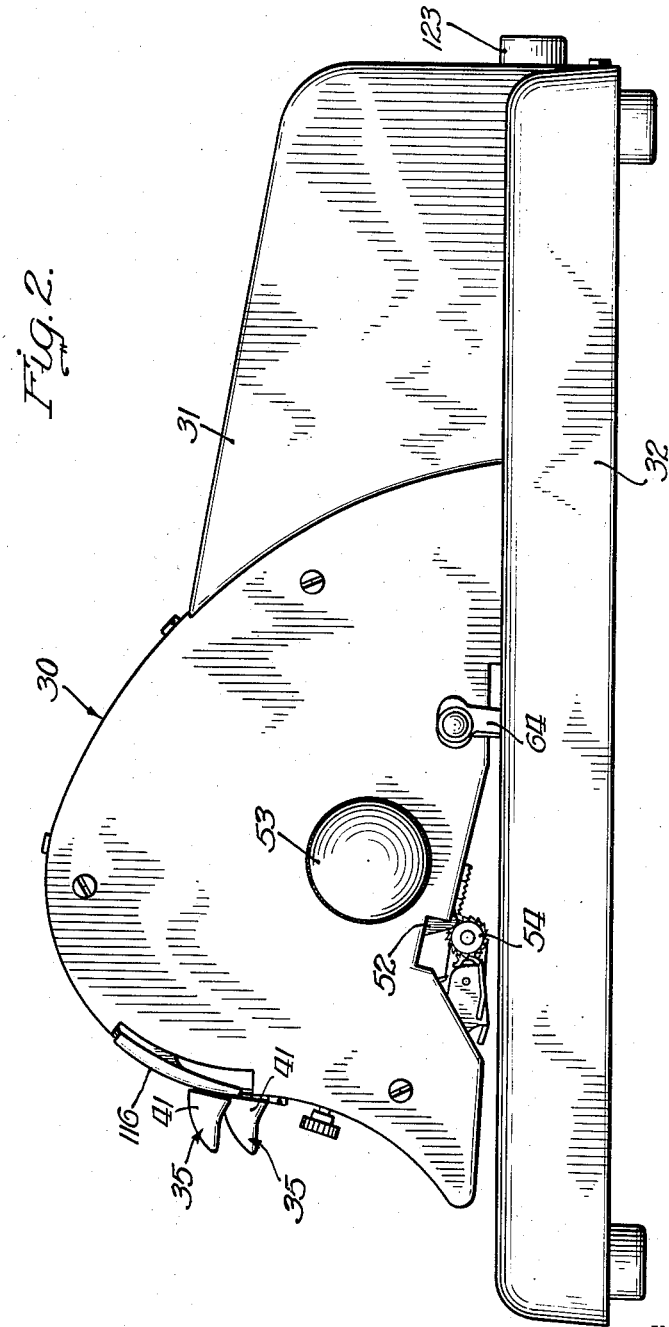
Figure 2 is a side view of the checkwriter of Figure 1.
Figure 3:
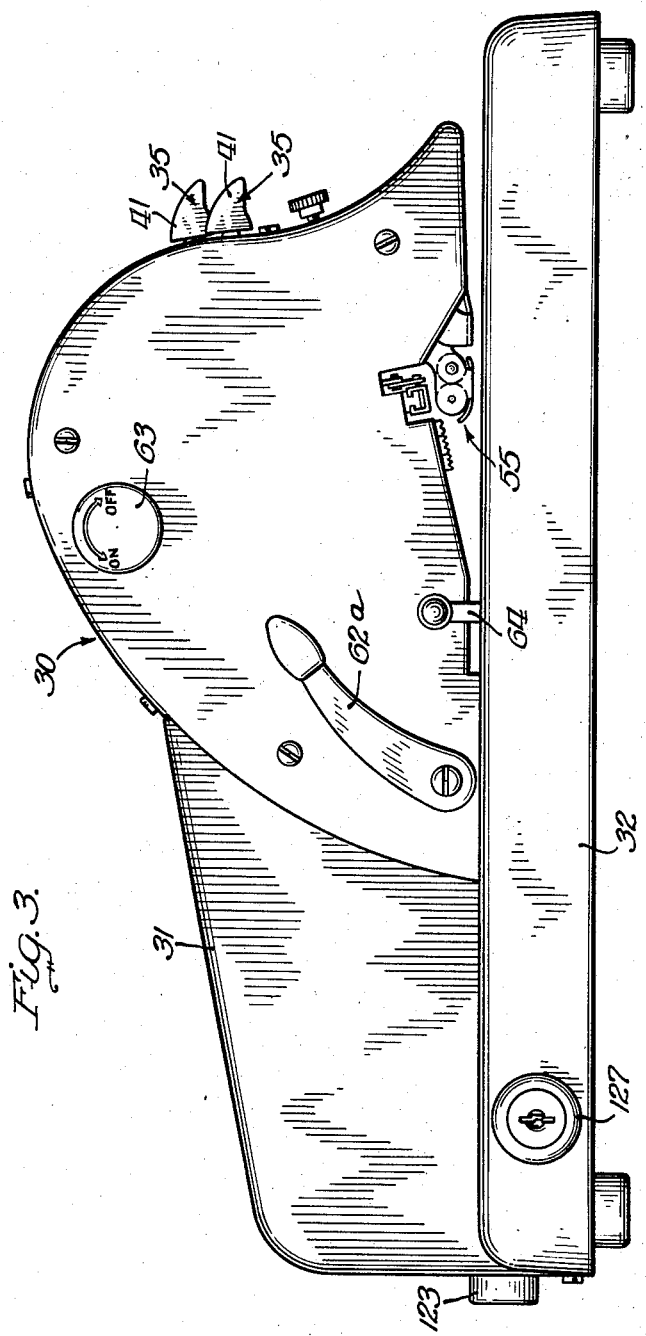
Figure 3 is a side view of the checkwriter of Figure 1 as seen from the side opposite that of Figure 2.

Referring further to the checkwriter unit, and to Figures 4 and 5, a stud 48 is secured in side plate 34 and projects outwardly therefrom. A bushing 49 is rotatably mounted on stud 48 and carries a cam 50 secured thereon. A screw 51 threads into the outer end of stud 48 with its head contacting the outer end of bushing 49 which is confined between plate 34 and the head of screw 51 so as to be restrained against endwise movement. Bushing 49 has a shoulder 52 of increased diameter, the outer face of which is substantially flush with the outer face of the corresponding side of the casing 30. The outer portion of bushing 49 is threaded and receives a rounded finishing cap nut 53. Normally the cam 50 is in its position shown in Figure 5, with nose element 53 in contact with collar 54 of an inking assembly 55 effective for holding it in depressed position out of contact with the printing characters on the printing line of the machine. The inking assembly is fully disclosed in the above identified patent and need not be described in detail here. Suffice it to say that the inking assembly includes an inking roll yieldingly urged toward the type segments and which is moved across the characters on the printing line, at the start of the printing operation, for inking them. It is important that the inking roll normally be held out of contact with the type characters, to avoid clogging and possible corrosion thereof. A toggle operating link 56, at the inner face of cam 50, is pivoted at its forward end, at 57, to the normally forward lower portion of cam 50. At its rearward end link 56 is pivoted on the end of pintle 58 of toggle 45, for which purpose pintle 58 projects through an arcuate slot 59 in side plate 34. A stud 60, secured to one of two arms (not shown) carrying the inking assembly 55, extends through an arcuate slot 61 in side plate 34 and through arcuate slot 62 in cam 50. When the cam 50 is turned clockwise, as viewed in Figure 5, to effect the printing operation, the inking assembly is released for movement toward the type characters on the printing line and the inking roll is moved across such characters, as above mentioned and as fully described in the patent above identified. The checkwriter unit may further be provided with an adjusting lever 62a (Figure 3) for enabling and disabling the platen for perforating the payee area of a check, a knob 63 marked "on" and "off" for enabling and disabling the automatic clearing means, and check stops 64 for limiting the extent of insertion of a check. As above indicated, the power operating means of my invention may be used for operating any suitable checkwriter unit, and it is not necessary to describe in greater detail the checkwriter unit shown by way of example. In performing the printing operation, the cam plate 50 is turned clockwise from its position shown in Figure 3 an appropriate extent to effect the printing operation and is then turned counterclockwise and thereby returned to its normal position, as will be understood from what has been said.

Referring now to the motor power unit and to Figures 4, 5 and 6 of the drawings, a mounting bracket 67 of substantially U-shape in plan is secured between the side plates 33 and 34 and projects a short distance rearwardly therebeyond. A speed reducing unit 68 is mounted on the rearward face of bracket 67 and an electric motor 69 is mounted on the downwardly extending arm of an L-shaped bracket 70 the upper horizontal arm of which seats upon and is secured to the housing of the speed reducing unit 68. The motor 69 is thus disposed in rear of the speed reducing unit 68, spaced a short distance therefrom, as shown in Figure 5. A channel spur pinion 71 is secured on shaft 72 of motor 69 and receives a toothed belt 73 which extends about a channel spur pinion 74 fixed on the input shaft 75 of the speed reducing unit 68. The motor thus has positive driving connection to the input shaft of the speed reducer, as is shown more clearly in Figure 24.

The speed reducer 68 comprises a substantially cubiform housing 78 having at one side a substantially L-shaped extension 79 and provided with removable front and rear cover plates 80 and 81, respectively. The input shaft 75 is rotatably mounted in the outer arm 82 of extension 79 and in the housing 78. A worm 83 is secured on shaft 75, within housing 78 and meshes with a worm wheel 84 secured on a vertical shaft 85 rotatably mounted within housing 78 adjacent the rear thereof. A worm 86 is secured on shaft 85 within housing 78 and meshes with a worm gear 87 within housing 78, secured on the output shaft 88 rotatably mounted in housing 78 and projecting outward therebeyond at the other side thereof, that is, at the side opposite to the extension 79. I thus provide a multiple worm drive speed reduction between the input shaft and the output shaft of the speed reducing unit, so that the output shaft 88 is driven at quite low speed relative to the input shaft 75. Due to the relatively great reduction in speed of the output shaft 88 relative to the motor shaft 72, the motor 69 may be a comparatively small high speed series motor, which is desirable as contributing to comparatively small overall size of the machine, the great reduction in speed referred to assuring adequate power for operating the checkwriter unit.

A sectoral plate 90 is fixed on the projecting end of output shaft 88 and is provided with an arcuate slot 91 of substantial length having an inner flange 92 of reduced thickness, as shown more clearly in Figure 5. A cam 93 is adjustably secured to plate 90 by a headed screw 94 passing through slot 91 and threaded through cam 93, the head of screw 94 seating on the flange 92. A flanged stud 95, shown more clearly in Figures 7, 8 and 9, is threaded through plate 30 adjacent the normally forward lower corner thereof, with a lock nut 96 threaded on its inner end and bearing against the inner face of plate 90. The body portion of stud 95 extends through a slot 97 in a guide plate 98 of reduced thickness about slot 97 to provide an inwardly extending shoulder 99. The rearward end portion 100 of guide plate 98 is of increased thickness outwardly and the ends of the slot 97 are of the same radius as the body portion of stud 95. A pressure block 101, shown more clearly in Figures 12 and 13, is slidably mounted in the rearward portion of slot 97 of plate 98 and is provided with side guide flanges 102 seating on flange 99 of plate 98. The rearward end of block 101 is convexed and curved on the same radius as the end of slot 97, and the forward end of block 101 is concaved on the same radius as the rearward end thereof. The guide plate 98 is disposed at the inner face of the rearward end portion of a main operating link 103 from the rearward end of which extends a slot 104 disposed to register with slot 97 in guide plate 98. Link 103 is provided with upper and lower ears 105 through which pass screws 106 threading into corresponding ears 98 of plate 107 for securing the latter to link 103. As is shown more clearly in Figure 9, the rearward portion of link 103 defines with the guide plate 98 a space 108 which receives circumferential flange 109 of stud 95. The forward end of pressure block 101 is slotted at 110 for reception of the rearward portion of flange 109. An adjusting screw 111 is threaded through the rearward portion 100 of plate 98 and bears against the rearward end of block 101 for adjusting the latter lengthwise of link 103, screw 111 being secured in position by a jam nut 112 threaded thereon and bearing against the rearward end of plate 98. The main operating link 103 extends across the outer face of cam 50 and is pivoted thereto at its forward end, at 113, as shown in Figure 5. Normally the sectoral plate 90, the main operating link 103 and the cam 50 are in the positions shown in Figure 5, with stud 95 in contact with link 103 at the forward end of slot 104 and spaced a material distance from the forward end of block 101.

A switch operating lever 116 is pivoted, at 117', on the outer face of side plate 34 adjacent the top and the front thereof. The lever 116 rests lightly upon an operating button or plunger 117 of a microswitch 118 also mounted on the outer face of side plate 34 adjacent and below lever 116. The switch 118 is of known type and is normally open, being closed only when the button 117 is depressed, spring means being provided for normally holding button 117 projected and also holding the lever 116 in its raised position. One side of microswitch 118 is connected by a lead 119, as shown more clearly in Figure 25, to one pole of a solenoid 120 mounted on the upper or horizontal arm of bracket 70, as shown more clearly in Figures 4, 5 and 6. Referring further to Figure 25, the other pole of solenoid 120 is connected by a lead 121 to a lead 122 connected at one end to a two pronged connector socket member 123 suitably mounted in an upwardly extending rear flange 124 of base section 32 of casing 30. The other side of switch 118 is connected by a lead 125 to a lead 126 connected at one end to one side of a lock switch 127 suitably mounted in and secured to upwardly extending side flange 128 of casing base section 32. The other side of lock switch 127 is connected by a lead 129 to one prong of socket member 123, it being understood that lead 122 is connected to the other prong of socket member 123. The other end of lead 126 is connected to one side of the motor 69 the other side of which is connected by a lead 130 to one side of a reset microswitch 131 of suitable known type. The microswitch 131 is shown in Figure 25 as provided with a movable blade 132 carrying a contact element 133, the switch normally being open with blade 132 in the position shown. Assuming switch 131 to be open, when it is actuated it closes and when it is again actuated it opens, remaining open until again actuated, it being understood that the switch opens and closes responsive to alternate actuations thereof. The lock switch 127 may be of any suitable known type and need not be described in detail. As shown in Figure 25, the other end of lead 122 is connected to blade 132 and, therefore, to contact 133, of the switch 131 which, as noted, may be a reset microswitch of known type. The lead 130 is also connected to one pole of a solenoid 133 the other pole of which is connected by a lead 134 to lead 126 is advance of the motor 69, solenoid 133 being thus connected in shunt with the motor. The socket member or plug 123 is adapted for cooperation with a plug cap 135, of known type, attached to one end of an electrical cord 136 to the other end of which is attached a suitable cap for connecting the machine to a suitable source of supply of electrical energy.

The reset microswitch 131 is secured on a finger 139 (Figure 4) extending upward from the upper arm of bracket 70, at the rear thereof, and extends forwardly from finger 139. An operating lever 140 is pivoted at its rearward end, at 141, on the rearward end of microswitch 132 and seats upon an upwardly extending operating plunger or button 142 at the top thereof. A second operating plunger or button 143 extends from the bottom of microswitch 131 adjacent the forward end thereof. A small roller 144 is rotatably mounted on the forward end of lever 140 at the upper face thereof. Roller 144 is disposed to be contacted by a roller 145 carried by substantially Z-shaped arm 146 of an oblong plate 147 slidably mounted on the upper face of bracket 170 adjacent the front thereof. Plate 147 is provided with a lengthwise slot 148 which receives a headed stud 149 secured in bracket 170 and a shouldered post 150 also secured in bracket 170. As will be understood, the stud 149 and the post 150 guide the plate 147 and limit endwise movement thereof in either direction. Plate 147 is provided at its inner end with an upwardly extending finger 151, shown more clearly in Figure 6, pivotally secured in the slotted outer end of plunger 152 of solenoid 120 by a cotter pin 153. A tension spring 154, anchored at one end to post 150 and at its other end to finger 151, normally holds plate 147 in its outer position, also holding the plunger 152 of solenoid 120 in its outer or projected position. In the outer position of plate 147 the roller 145 is disposed adjacent the outer side of roller 144 on switch operating lever 140 and slightly lower than roller 144, as shown in Figures 4, 5 and 6.

The solenoid 133 is mounted on a bracket 157 secured to the bottom of the housing 78 of speed reducer 68, as shown more clearly in Figures 14 and 15, the forward end portion of solenoid 133 being accommodated by an opening 158 extending from the lower edge of extension 79 of housing 78, as shown in Figure 20. A steel brake band or strap 159 is pivoted at its upper end on a shouldered screw 160 secured in a bracket 161 which seats on and is secured to the top of housing 78 of the speed reducer 68. The brake band 159 is disposed substantially concentrically with a brake V pulley 162 secured on the input shaft 75 within the extension 79 of housing 78. Brake band 159 is provided with a liner or shoe 163 preferably formed of asbestos and of proper size and shape to fit tightly within the groove of pulley 162. The brake band 159 extends rearwardly below and beyond pulley 162 and is provided, at its rearward end, with a downwardly extending finger 164, shown more clearly in Figures 15 and 17, disposed between the bight portion of a substantially U-shaped stirrup 165 and a transverse pin 166 securing stirrup 165 to the rearward end of plunger 167 of solenoid 133. A compression spring 168, disposed about solenoid 167 and stirrup 165 and confined between finger 164 and the rearward end of solenoid 133, normally holds plunger 167 in its rearward projected position shown in Figure 15. The brake shoe 163 is then held in pressure contact with the pulley 162 effective for holding input shaft 175 against rotation thereby locking the output shaft 88 of the speed reducer 68 against rotation, due to the multiple worm drive of the speed reducer. That condition obtains at the end of a printing operation and when the main operating link 103 has been moved to its extreme forward position shown in Figure 5. At that time the stud 95 is in contact with link 103 at the forward end of slot 104 and the cam 50 is in its normal position shown in Figure 5 with nose 52 thereof in contact with roller 54 of the inking assembly effective for holding the inking roller out of contact with the type characters on the printing line of the machine, as previously mentioned. Due to the fact that the output shaft 88 of speed reducer 68 is locked against rotation, the sectoral plate 90 is also locked against counter-clockwise movement so that the parts referred to are locked in the positions stated.

In order to perform a printing operation, the switch lever 116 is momentarily depressed, thereby closing the microswitch 118. That energizes the solenoid 120 which retracts its plunger 152 and pulls the plate 147 inward in opposition to the tension spring 154. In the inward movement of plate 147 roller 145 passes over roller 144 depressing lever 140 of the reset microswitch 131, thereby closing that switch. When the switch lever 116 is released the microswitch 118 again opens deenergizing the solenoid 120 and the tension spring 154 returns plunger 152 and plate 147 to their normal outer positions. In the outward movement of plate 147 roller 145 again passes over roller 144 thereby depressing lever 140 and button 142 of the reset microswitch 131, but that switch remains open, as previously explained. Closing of the reset microswitch 131 energizes the solenoid 133, as will be clear from Figure 25, and also energizes the motor 69. When that occurs, the solenoid 133 retracts its plunger 167 thereby moving the brake shoe 163 out of engagement with the brake pulley 162 whereby the motor 69 is enabled to start without load, it being noted in that connection that the stud 95 is then spaced a material distance in front of the pressure transmitting block 101, as shown in Figure 5. The motor starts free of load, except for such slight load as might be imposed by the speed reducing unit 68, and comes up to speed before the stud 95 contacts the pressure transmitting block 101. Thereafter stud 95 contacts block 101 and transmits pressure to the main operating link 103 effective for moving the latter rearward an appropriate distance for effecting the printing operation. The output shaft 88 of the speed reducer 68 turns through approximately one complete revolution during which the stud 95, after completion of the rearward movement of the main operating link 103, contacts the latter at the forward end of slot 104 so as to move link 103 forward and return the latter and associated parts to their normal positions. During this rotation of plate 90 with output shaft 88 the cam 93 contacts the lower plunger or button 143 of the reset microswitch 131 forcing it upward and thereby opening that switch. When that occurs, the brake solenoid 133 is deenergized and compression spring 168 returns plunger 167 of solenoid 133 to its projected position and moves the brake shoe 163 into pressure contact with the brake pulley 162. Opening of the reset microswitch 131 also deenergizes the motor 69 so that the brake is effective for stopping rotation of input shaft 75 of the speed reducer as soon as the main operating link 103 has been returned to its full forward normal position, cam 93 being appropriately adjusted to that end. The link 103 is then locked against rearward movement and the cam 50 is locked against counterclockwise movement with the nose 52 in contact with roller 54, as and for the reasons above stated. The lock switch 127 is for the purpose of preventing unauthorized use of the machine, as will be understood.

As above indicated, it will be understood that changes in detail may be resorted to, and I intend to include all such variations, as fall within the scope of the appended claims, in this application in which the preferred form only of my invention has been disclosed.

I claim:

1. In a motor operated checkwriter, printing mechanism comprising an operating cam having a normal position and turnable therefrom in one direction for effecting a printing operation and turnable in the opposite direction to normal position upon completion of the printing operation, an electric motor, means providing permanent driving connection between said cam and said motor comprising a speed reducer having an input shaft and an output shaft with a positive drive therebetween, a stud secured to said output shaft eccentric thereto, a link assembly pivoted at one end to said cam and having at its other end a lengthwise slot receiving said stud, the latter being disposed to contact said link assembly at one end of said slot and turn said cam in said one direction and to contact said link assembly at the other end of said slot and turn said cam in said opposite direction to its said normal position, incident to turning of said output shaft through one operating cycle comprising approximately one revolution thereof, said stud remaining in contact with said link assembly at said other end of said slot upon completion of an operating cycle of said output shaft, and means for energizing said motor and then automatically deenergizing it and stopping said input shaft thereby stopping said output shaft upon completion of one operating cycle of the latter.

2. In a motor operated checkwriter, printing mechanism comprising an operating cam having a normal position and turnable therefrom in one direction for effecting a printing operation and turnable in the opposite direction to normal position upon completion of the printing operation, a speed reducer in rear of said mechanism having an input shaft and an output shaft with a positive drive therebetween, an elecric motor having a permanent drive to said input shaft and thence to said output shaft, a plate secured on said output shaft, a stud secured to said plate eccentric to said output shaft, a link assembly pivoted at its forward end to said cam and having at its other end a lengthwise slot receiving said stud, the latter being disposed to contact said link assembly at the rearward end of said slot and turn said cam in said one direction and to contact said link assembly at the forward end of said slot and turn said cam in said opposite direction to its said normal position, incident to turning of said output shaft through one operating cycle comprising approximately one revolution thereof, said stud remaining in contact with said link assembly at the forward end of said slot and being spaced a material distance away from the rearward end of said slot upon completion of an operating cycle of said output shaft, and means for energizing said motor and then automatically deenergizing it and stopping said input shaft thereby stopping said output shaft upon completion of one operating cycle of the latter.

3. In a motor operated checkwriter, printing mechanism comprising an operating cam having a normal position and turnable therefrom in one direction for effecting a printing operation and turnable in the opposite direction to normal position upon completion of the printing operation, a speed reducer in rear of said mechanism having an input shaft and an output shaft with a positive drive therebetween, an electric motor having a permanent drive to said input shaft and thence to said output shaft, a plate secured on said output shaft, a stud secured to said plate eccentric to said output shaft, a link assembly pivoted at its forward end to said cam and having at its other end a lengthwise slot receiving said stud, the latter being disposed to contact said link assembly at the rearward end of said slot and turn said cam in said one direction and to contact said link assembly at the forward end of said slot and turn said cam in said opposite direction to its said normal position, incident to turning of said output shaft through one operating cycle comprising approximately one revolution thereof, said stud remaining in contact with said link assembly at the forward end of said slot and being spaced a material distance away from the rearward end of said slot upon completion of an operating cycle of said output shaft, means for energizing said motor, and supplementary means actuated by said output shaft for automatically deenergizing said motor and stopping said input shaft thereby stopping said output shaft upon completion of one operating cycle of the latter.

4. In a motor operated checkwriter, printing mechanism comprising an operating cam having a normal position and turnable therefrom in one direction for effecting a printing operation and turnable in the opposite direction to normal position upon completion of the printing operation, a speed reducer in rear of said mechanism having an input shaft and an output shaft with a positive drive therebetween, an electric motor having a permanent drive to said input shaft and thence to said output shaft, a plate secured on said output shaft, a stud secured to said plate eccentric to said output shaft, a link assembly pivoted at its forward end to said cam and having at its other end a lengthwise slot receiving said stud, the latter being disposed to contact said link assembly at the rearward end of said slot and turn said cam in said one direction and to contact said link assembly at the forward end of said slot and turn said cam in said opposite direction to its said normal position, incident to turning of said output shaft through one operating cycle comprising approximately one revolution thereof, said stud remaining in contact with said link assembly at the forward end of said slot and being spaced a material distance away from the rearward end of said slot upon completion of an operating cycle of said output shaft, means for energizing said motor, and supplementary switch and brake means controlled by said output shaft for automatically deenergizing said motor and stopping said input shaft thereby stopping said output shaft upon completion of one operating cycle of the latter.

5. In a motor operated checkwriter, printing mechanism comprising an operating cam having a normal position and turnable therefrom in one direction for effecting a printing operation and turnable in the opposite direction to normal position upon completion of the printing operation, a speed reducer in rear of said mechanism having an input shaft and an output shaft with a positive drive therebetween, an operating link pivoted at its forward end to said cam and connected at its rearward end to said output shaft eccentrically thereof, said link being effective for turning said cam in said one direction and in said opposite direction thereby returning it to its said normal position during each operating cycle of said output shaft comprising approximately one revolution thereof, an electric motor having permanent driving connection to said input shaft, a brake pulley secured on said input shaft, a brake member yieldingly urged toward said pulley into braking engagement therewith, means comprising a solenoid for moving said brake member to and holding it in ineffective position, a normally open switch controlling said motor and solenoid, means for closing said switch, and means for automatically opening said switch responsive to completion of an operating cycle of said output shaft.

6. In a motor operated checkwriter, printing mechanism comprising an operating cam having a normal position and turnable therefrom in one direction for effecting a printing operation and turnable in the opposite direction to normal position upon completion of the printing operation, a speed reducer in rear of said mechanism having an input shaft and an output shaft with a positive drive therebetween, an operating link pivoted at its forward end to said cam and connected at its rearward end to said output shaft eccentrically thereof, said link being effective for turning said cam in said one direction and in said opposite direction thereby returning it to its said normal position during each operating cycle of said output shaft comprising approximately one revolution thereof, an electric motor having permanent driving connection to said input shaft, a brake pulley secured on said input shaft, a brake member yieldingly urged toward said pulley into braking engagement therewith, means comprising a solenoid for moving said brake member to and holding it in ineffective position, a normally open switch controlling said motor and solenoid, means comprising a manually operated switch for optionally closing said first switch, and means for automatically opening said first switch responsive to completion of an operating cycle of said output shaft.

7. In a motor operated checkwriter, printing mechanism comprising an operating cam having a normal position and turnable therefrom in one direction for effecting a printing operation and turnable in the opposite direction to normal position upon completion of the printing operation, an electric motor, means comprising an output shaft driven by said motor and a stud driven by said shaft eccentric thereto, a link assembly pivoted at one end to said cam and having at its other end a lengthwise slot receiving said stud, the latter being disposed to contact said link assembly at one end of said slot and turn said cam in said one direction and to contact said link assembly at the other end of said slot and turn said cam in said opposite direction to its said normal position, incident to turning of said output shaft through one operating cycle comprising approximately one revolution thereof, said stud remaining in contact with said link assembly at said other end of said slot upon completion of an operating cycle of said operating shaft, and means for energizing said motor and then automatically deenergizing it and stopping said output shaft upon completion of one operating cycle of the latter.

8. In a motor operated checkwriter, printing mechanism comprising an operating cam having a normal position and turnable therefrom in one direction for effecting a printing operation and turnable in the opposite direction to normal position upon completion of the printing operation, an electric motor, an output shaft driven by said motor, a plate on said output shaft driven thereby, a stud secured to said plate eccentric to said shaft, a link assembly pivoted at its forward end to said cam and having at its other end a lengthwise slot receiving said stud, the latter being disposed to contact said link assembly at the rearward end of said slot and turn said cam in said one direction and to contact said link assembly at the forward end of said slot and turn said cam in said opposite direction to its said normal position, incident to turning of said output shaft through one operating cycle comprising approximately one revolution thereof, said stud remaining in contact with said link assembly at the forward end of said slot and being spaced from the rearward end of said slot upon completion of an operating cycle of said output shaft, and means for energizing said motor and then automatically deenergizing it and stopping said output shaft upon completion of one operating cycle of the latter.

References Cited in the file of this patent

UNITED STATES PATENTS

| 1,745,219 | Jean | Jan. 28, 1930 |
| 2,350,703 | Ryan | June 6, 1944 |
| 2,352,802 | Ryan | July 4, 1944 |
| 2,629,322 | Levin | Feb. 24, 1953 |
| 2,645,174 | Levin | July 14, 1953 |
| 2,651,988 | Thomas et al. | Sept. 15, 1953 |
| 2,697,981 | Rindfleisch | Dec. 28, 1954 |
| 2,707,432 | Rindfleisch | May 3, 1955 |